United States Patent [19]

Umezawa

[11] Patent Number: 4,740,726
[45] Date of Patent: Apr. 26, 1988

[54] VIBRATOR-TYPE LEVEL SENSOR

[75] Inventor: Takayuki Umezawa, Daitoh, Japan

[73] Assignee: Nohken Inc., Japan

[21] Appl. No.: 888,523

[22] Filed: Jul. 21, 1986

[51] Int. Cl.⁴ .......................................... H01L 41/08
[52] U.S. Cl. ................... 310/316; 310/317; 310/23; 310/323; 73/290 V; 340/621
[58] Field of Search ............... 310/322, 323, 26, 314, 310/328, 316–319; 73/861.18, 861.27, 861.28, 861.29, 861.30, 861.31, 290 R, 290 V, DIG. 4; 340/603, 610, 618, 621

[56] References Cited

U.S. PATENT DOCUMENTS

| | | | |
|---|---|---|---|
| 2,990,482 | 6/1961 | Kenny | 310/323 X |
| 3,256,738 | 6/1966 | Giacomo et al. | 73/290 V |
| 3,266,311 | 8/1966 | Andreasen et al. | 340/621 X |
| 3,312,107 | 4/1967 | Burns et al. | 73/290 V |
| 3,625,058 | 12/1971 | Endress | 73/290 V |
| 4,170,765 | 10/1979 | Austin et al. | 73/290 V X |
| 4,202,049 | 5/1980 | Wetzel | 73/290 V |
| 4,213,337 | 7/1980 | Langdon | 340/621 |
| 4,325,416 | 4/1982 | Hermann | 73/290 V |
| 4,540,981 | 9/1985 | Lapetina et al. | 310/321 X |
| 4,594,584 | 6/1986 | Pfeiffer | 310/323 X |

*Primary Examiner*—Mark O. Budd
*Attorney, Agent, or Firm*—Darby & Darby

[57] ABSTRACT

A vibrator-type level sensor having a detecting pipe (20) in which an inner vibration member (22) with piezo-electric devices (8a) (8b) (8c) is mounted, the detecting pipe (20) and the inner vibration member (22) constituting a folded cantilever.

21 Claims, 11 Drawing Sheets

VIBRATOR-TYPE LEVEL SENSOR

FIELD OF THE INVENTION AND RELATED ART STATEMENT

1. FIELD OF THE INVENTION

The present invention relates to a level sensor for detecting a level of powdery, granular or liquid material in a container, and more particularly to a level sensor for detecting the level by change of vibration of a member thereof at the detection of such material.

2. DESCRIPTION OF THE RELATED ART

A typical conventional vibrator-type level sensor has a structure and operation as described hereafter with reference to FIG. 1. The vibration-type level sensor has a vibration member 2 supported by a diaphragm 4. An outer side 2a of the vibration member 2 is projected from the pipe 6 and inner side 2b of the vibration member 2 is kept in the pipe 6. On the inner side 2b of the vibration member 2, receiving piezo-electric device 8a and a vibrating piezo-electric device 8b are provided.

The vibrating piezo-electric device 8b vibrates the vibration member 2. This vibration is detected and converted into electric signal by the receiving piezo-electric device 8a. The converted electric signal is amplified and impressed to the vibrating piezo-electric device 8b. Therefore, the vibration member 2 oscillates at a frequency determined in accordance with an eigenfrequency of the vibration member 2.

When powdery, granular or liquid material as material to be detected touches the vibration member 2, the vibration stops or decreases. The detecting circuit provided in a case 16 detects this change, thus detects the touching by the material to be detected. Therefore, the level sensor provided in a container can detect the level of the material to be detected.

In the prior art vibrator-type level sensor, the use of the diaphragm 4 reduces the strength and therefore shortens the level sensor's life. Further, when the powdery material is stuck on the diaphragm 4, the stuck powdery material causes an erroneous detection.

OBJECT AND SUMMARY OF THE INVENTION

It is an object of the present invention to provide a vibrator-type level sensor having long life and accurate detection.

The vibrator-type level sensor in accordance with the present invention comprises:
a hollow member one end of which is fixed and the other end of which is blockaded,
an inner vibration member which is provided in the other end of the hollow member and one end of which is fixed to the other end of the hollow member,
vibrating means for driving the inner vibration member, and
detecting means for detecting a decrease of vibration of the inner vibration member.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
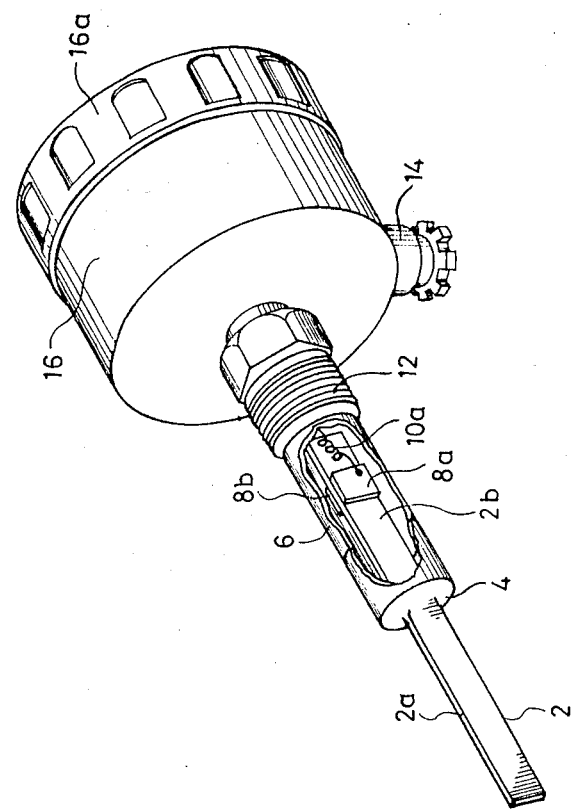
FIG. 1 is the perspective view of the vibrator-type level sensor of prior art.
Figure 2:
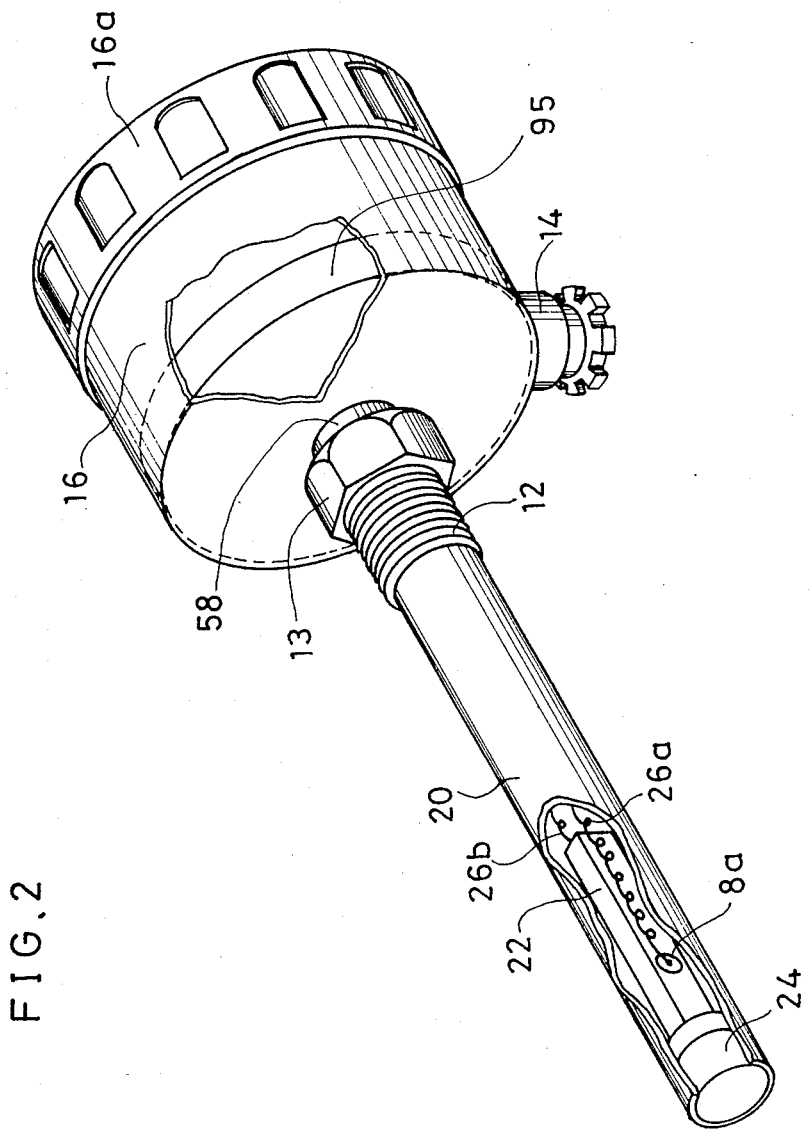
FIG. 2 is a perspective view of a vibrator-type level sensor embodying the present invention.

The structure of a preferred embodiment of a vibrator-type level sensor embodying the present invention is described in detail with reference to FIG. 2. As shown in FIG. 2, as case 16 of metal substance, is configurated substantially in a cylinder-shape having a cap 16a. The case 16 has a weight 95 and an electric circuit (not shown) therein. In front of the case 16, a base pipe 58 having a screw 12 is projected from the case 16. One end of a detecting pipe 20 with thinner thickness than the base pipe 58 is fixed to the base pipe 58. Another end of the detecting pipe 20 is closed by a tapped tip 24 which is welded to the detecting pipe 20. An inner vibration member 22 is provided in the inner space of the detecting pipe 20, and one end of a vibration member 22 is screwed to the tapped tip 24. Therefore, a folded cantilever is formed by the detecting pipe 20 and the inner vibration member 22. On the inner vibration member 22, a vibrating piezo-electric device (not shown) and a receiving piezo-electric device 8a are provided.

The vibrating piezo-electric device vibrates the inner vibration member 22. This vibration is detected and converted into electric signal by the receiving piezo-electric device 8a. The converted electric signal is sent to the electric circuit through a lead wire 26a. The electric circuit amplifies this converted electric signal and impresses it to the vibrating piezo-electric device (not shown) through a lead wire 26b. Therefore, the inner vibration member 22 oscillates at a frequency determined in accordance with an eigenfrequency of the folded cantilever formed by the detecting pipe 20 and the inner vibration member 22. The weight 95, which weighs enough larger than the detecting pipe 20 and the inner vibration member 22, stabilizes the vibration of the inner vibration member 22. Instead of the weight 95, a thick pipe for the base pipe 58 may be used as weight.

When powdery, granular or liquid material as material to be detected touches to the detecting pipe 20, the vibration of the inner vibration member 22 stops or decreases. The electric circuit detects this change, thus detects the touching of the material to be detected. Therefore, the level sensor provided in a container can detect the level of the material to be detected.

Figure 3:
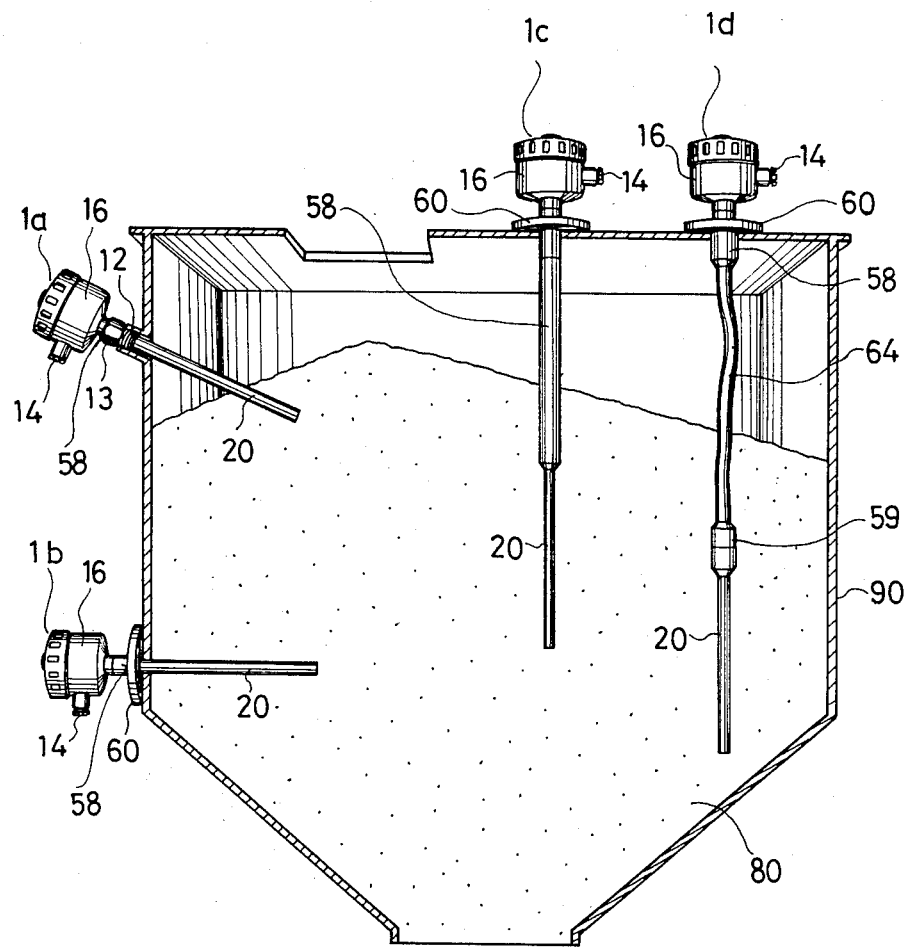
FIG. 3 is a semi-diagrammatical vertical sectional view of the vibrator-type level sensors embodying the present invention installed to a container.

The above-mentioned vibrator type level sensor can be installed to a container 90, in which a granular material 80 to be detected is put, in various way as shown in FIG. 3. A vibrator-type level sensor 1a is mounted to a side wall of the container 90 by a screw 12 and a nut 13. A vibrator-type level sensor 1b is mounted to the side wall of the container 90 by mounting a flange 60 to the container 90 by screws. When it is difficult to mount the level sensor to the side wall of the container 90, a sensor 1c having a longer base pipe 58 of metal material may be used or a sensor 1d having a flexible pipe 64 may be used. The sensor 1d has a second base pipe 59 which weighs larger value than the detecting pipe 20. As a result of using the flexible pipe 64, a transport volume can be made small by bending the flexible pipe 64.

Figure 4:
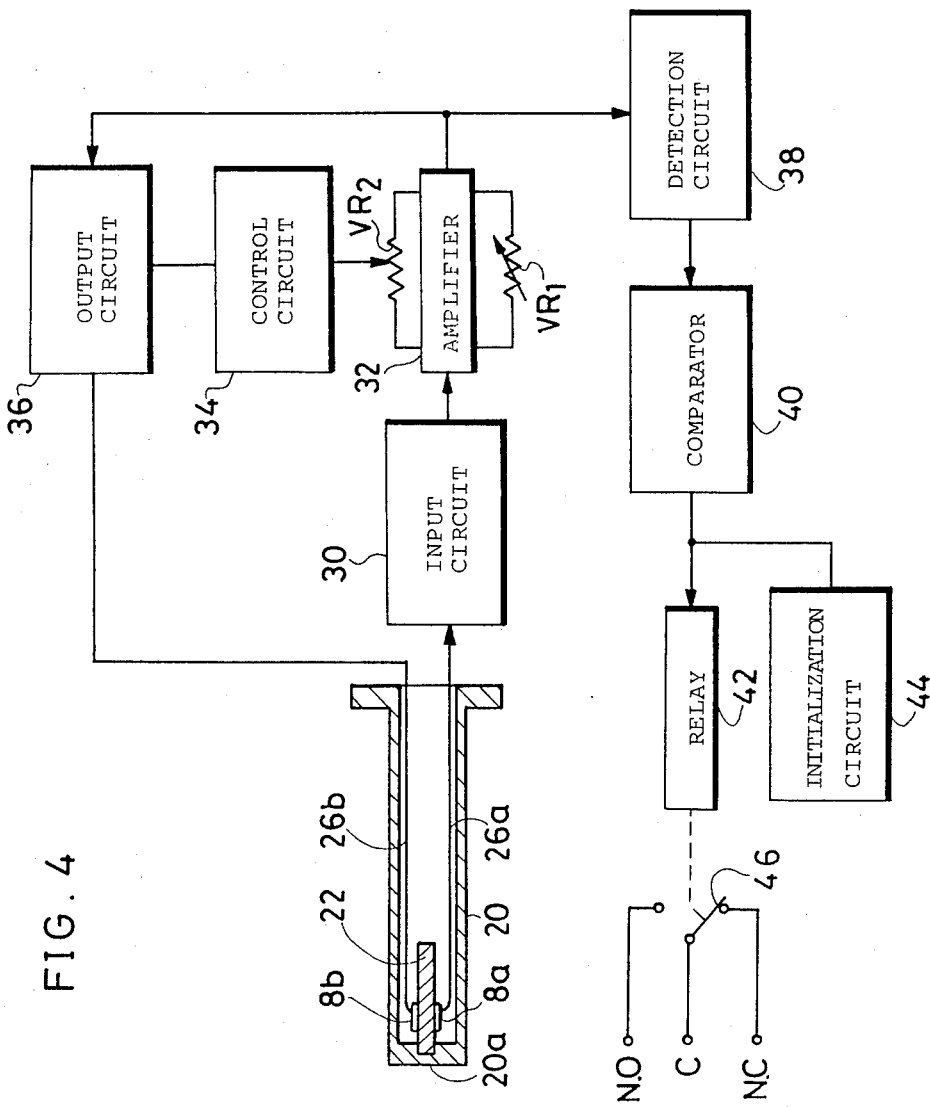
FIG. 4 is a block diagram of the vibrator-type level sensor embodying the present invention.

FIG. 4 shows a block diagram of the electric circuit provided in the case 16. In this embodiment, the vibrating piezo-electric device 8b, the receiving piezo-electric device 8a, an input circuit 30, an amplifier 32, and an output circuit 36 constitute an oscillation circuit. The vibrating piezo-electric device 8b receives output from the output circuit 36 and vibrates the inner vibration member 22. The receiving piezo-electric device 8a provided on the vibration member 22 converts this vibration into electric signal. The converted electric signal is inputted to the amplifier 32 through the input circuit 30. Output of the amplifier is impressed to the vibrating piezo-electric device 8b through the output circuit 36. Therefore, the inner vibration member 22 vibrates at a frequency determined in accordance with an eigenfrequency of the folded cantilever formed by the detecting pipe 20 and the inner vibration member 22. In other words, the oscillation circuit oscillates at the frequency determined in accordance with the eigenfrequency of the folded cantilever.

Output of the oscillation circuit, i.e., output of the amplifier 32 is detected by a detection circuit 38. The enveloped output from the detection circuit 38 is inputted to a comparator 40. In the comparator 40, an amplitude of the output signal from the detection circuit 38 is compared with an amplitude of a reference signal. When touching of the granular material to the detecting pipe 20 reduces the output signal smaller than the reference amplitude, the comparator issues an output which drives a relay 42 for switching a contact 46.

A control circuit 34 is provided for reducing a beat of the inner vibration member 22 by controlling a gain of the amplifier 32. For preventing the erroneous operation, an initialization circuit 44 prohibits the operation of the relay 42 during about 3 minutes from closing a main switch of the level sensor.

Figure 5:
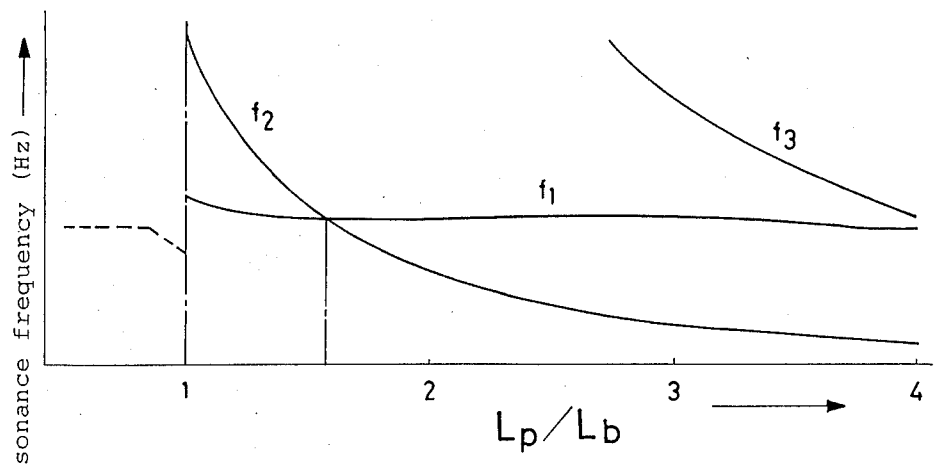
FIG. 5 is a graph for showing a relation between a vibration frequency of the inner vibration member 22 and a value of a ratio $L_p/L_b$ in the vibrator-type level sensor of FIG. 4, where Lp is a length of the detecting pipe 20 and Lb is a length of the inner vibration member 22.

The eigenfrequency of a cantilever is given by the following equation:

$$f = \left(\frac{a}{L}\right)^2 \sqrt{\frac{EI}{PA}}$$

where:
L: length of cantilever
E: young's modulus of cantilever
P: density of cantilever
A: square measure of cantilever
I: moment of inertia of cantilever
a: modulus of frequency FIG. 5 shows relation between a resonance frequency and a value of a ratio Lp/Lb when Lp is changed and Lb is held constant, where Lp is a length of the detecting pipe 20 and Lb is a length of the inner vibration member 22. In FIG. 5, a curve $f_1$ shows the eigenfrequency of the level sensor. The curve $f_1$ is plotted by experimentation data. A curve $f_2$ shows a first mode oscillation of the detecting pipe 20, and a curve $f_3$ shows a second mode oscillation of the detecting pipe 20. Both of the curves $f_2$ and $f_3$ are plotted basing on calculation. As shown in FIG. 5, the eigenfrequency of the level sensor is almost constant irrespective of the value of the ratio Lp/Lb. The curve $f_1$ is approximate to a calculation curve of an eigenfrequency of the inner vibration member 22. Therefore, it is clear that the inner vibration member 22 compulsory vibrates the detecting pipe 20.

Figure 6:
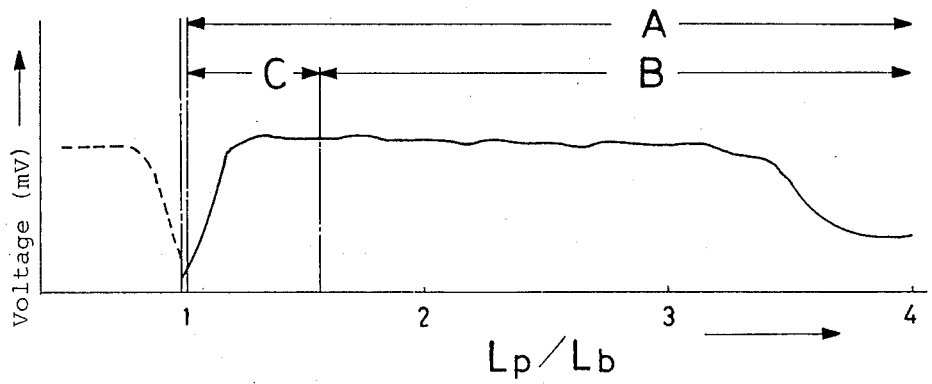
FIG. 6 is a graph for showing a relation between a vibration amplitude of the inner vibration member 22 and the value of the ratio $L_p/L_b$ in the vibrator-type level sensor of FIG. 4.

FIG. 6 shows relation between the output voltage from the oscillation circuit and the value of the ratio Lp/Lb. In FIG. 6, the output voltage rapidly falls around the ratio Lp/Lb of 1. In FIG. 6, in a range shown by B, a phase of the impressed signal to the vibrating piezo-electric device 2b is same as that of the output signal from the receiving piezo-electric device 2a. Therefore, the electric circuit of FIG. 4 is suitable for using in the range B.

In a range shown by C, a phase of the impressed signal to the vibrating piezo-electric device 2b is different from that of the output signal from the receiving piezo-electric device 2a. For using in the range C, therefore, the phase adjustment amplifier is suitable instead of the amplifier 32. In this case, the touching of the granular material can be detected by detecting the phase difference signal from the phase adjustment amplifier.

Figure 7:
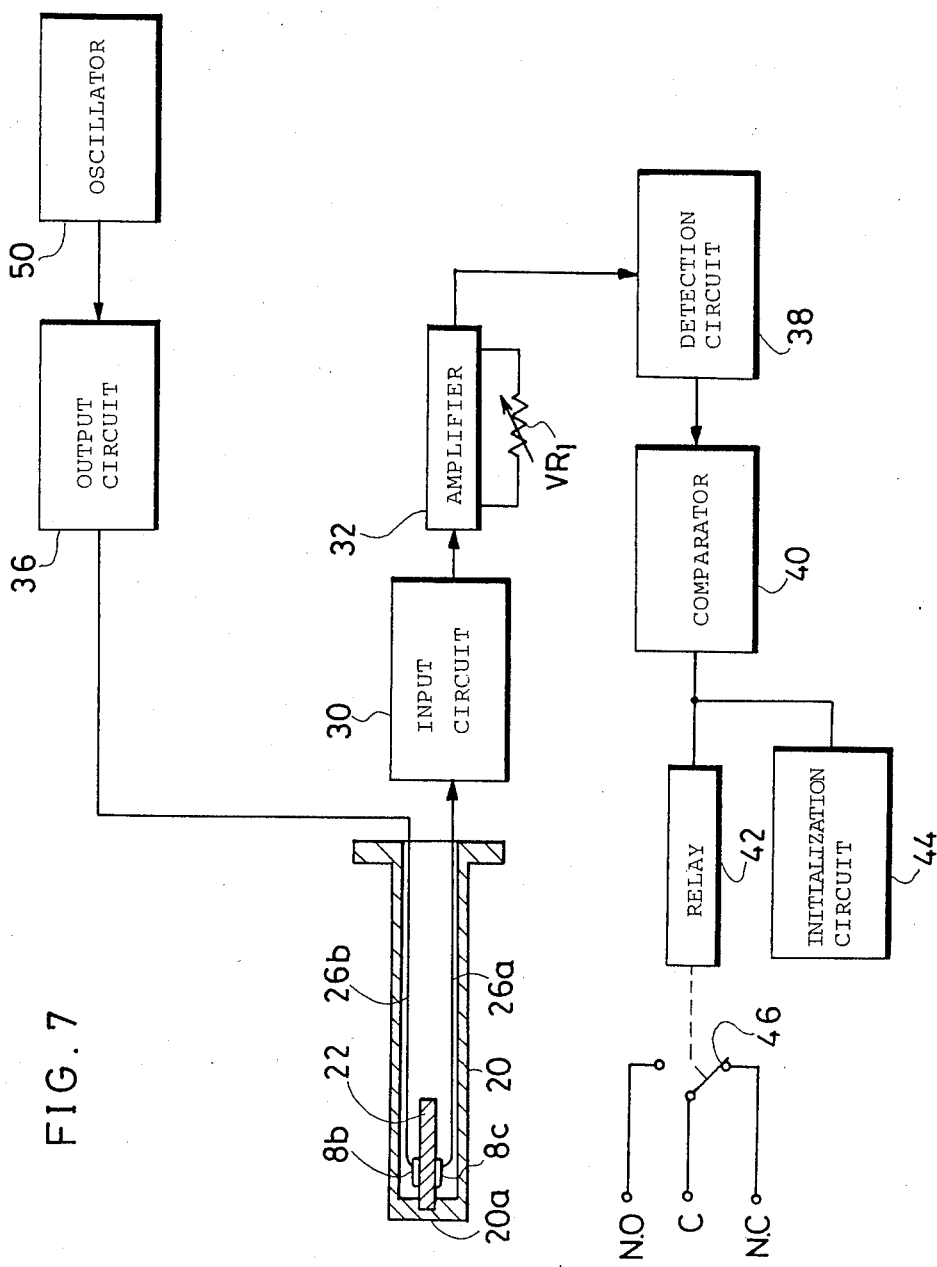
FIG. 7 is a block diagram of another embodiment of the vibrator-type level sensor embodying the present invention.

FIG. 7 shows a block diagram of the electric circuit of other embodiment of the present invention. The vibrating piezo-electric device 8b receives output from an oscillator 50 through an output circuit 36, and vibrates the inner vibration member 22. The detecting piezo-electric device 8c provided on the vibration member 22 converts this vibration into electric signal. The converted electric signal is inputted to the amplifier 32 through the input circuit 30. Output of the amplifier 32 is detected by a detection circuit 38. The enveloped output from the detection circuit 38 is inputted to a comparator 40. In the comparator 40, an amplitude of the output signal from the detection circuit 38 is compared with an amplitude of a reference signal. When the touching of the granular material to the detecting pipe 20 reduces the output signal smaller than the reference amplitude, the comparator issues an output which drives a relay 42 for switching a contact 46.

The electric circuit of FIG. 7 is operable irrespective of a phase difference between an impressed and output signal. Therefore, the electric circuit can be used both in ranges B and C, i.e., in a whole range of A in FIG. 6.

Figure 8:
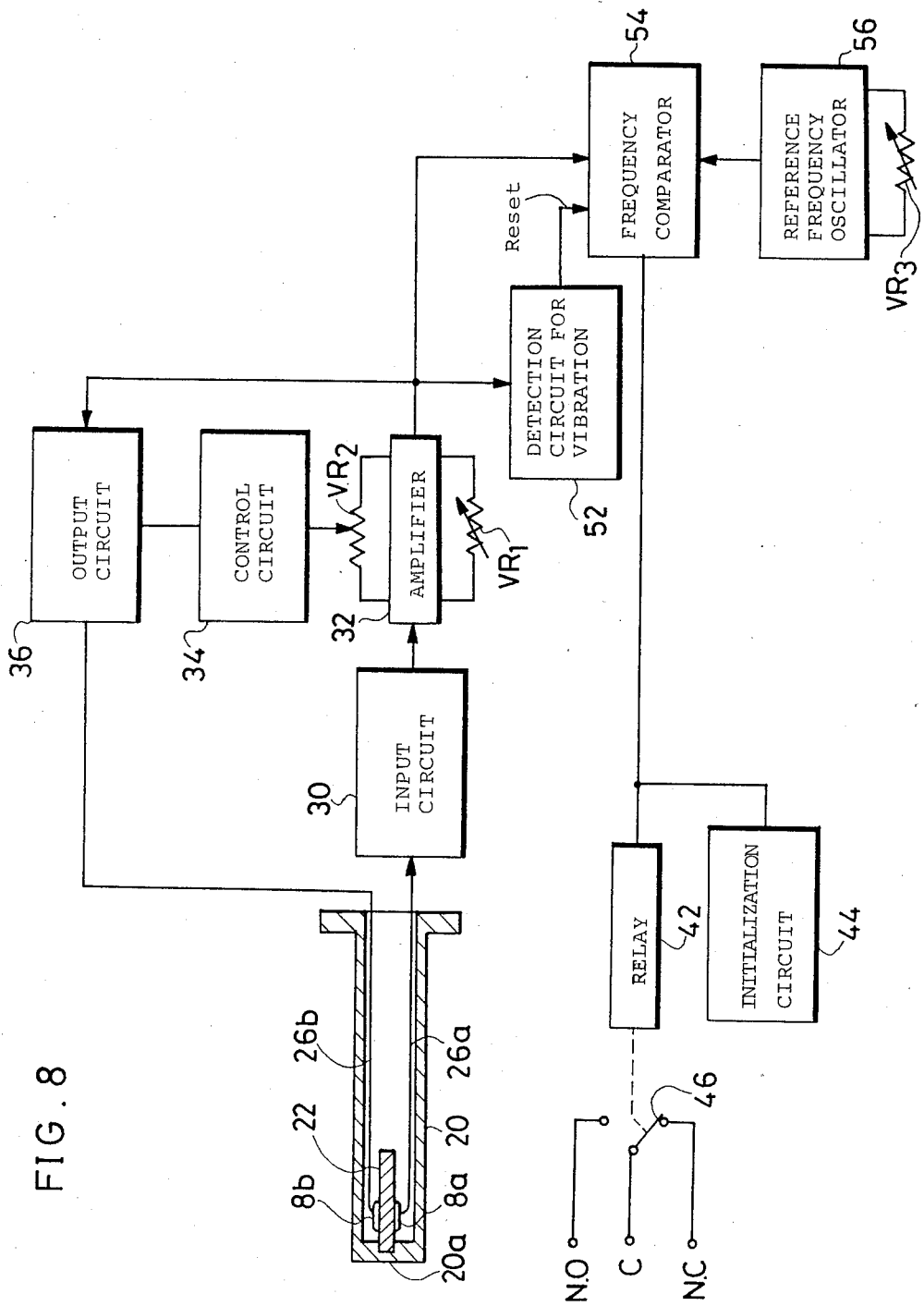
FIG. 8 is a block diagram of an embodiment of the vibrator-type level sensor, which detects the touching of the material to be detected by detecting a change of frequency of the inner vibration member 22, embodying the present invention.

FIG. 8 shows a block diagram of the electric circuit provided in the case 16. In this embodiment, the vibrating piezo-electric device 8b, the receiving piezo-electric device 8a, an input circuit 30, an amplifier 32, and an output circuit 36 constitute an oscillation circuit. In the same manner as the circuit of FIG. 4, the inner vibration member 22 vibrates at a frequency determined in accordance with the eigenfrequency of the folded cantilever formed by the detecting pipe 20 and the inner vibration member 22. Output of the oscillation circuit, i.e, output of the amplifier 32 is inputted to a frequency comparator 54. In the frequency comparator 54, a frequency of the output signal from the oscillation circuit is compared with a reference frequency from a reference frequency oscillator 56.

When the touching of the granular material to the detecting pipe 20 changes the frequency of the oscillation circuit, a frequency comparator 54 issues an output which drives a relay 42 for switching a contact 46.

Figure 9:
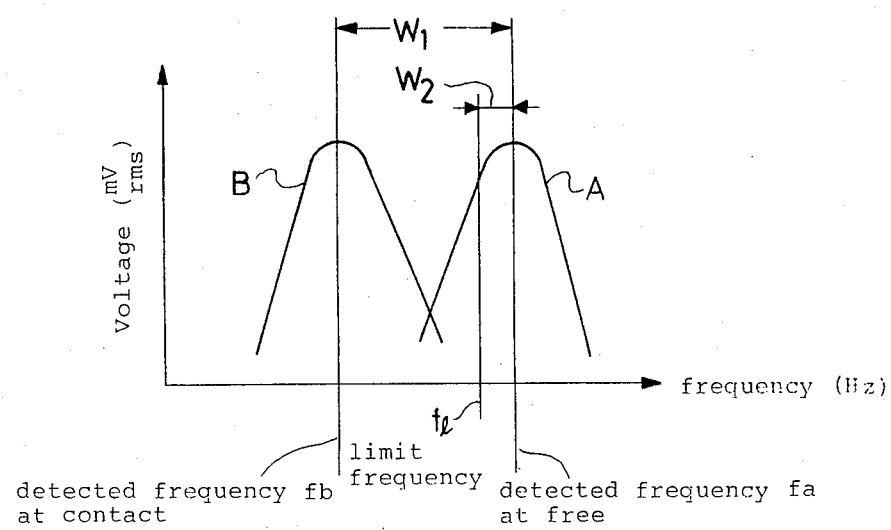
FIG. 9 is a graph for showing a frequency shift of the inner vibration member 22, in the vibrator-type level sensor of FIG. 8.

FIG. 9 shows a frequencies fa and fb of the free and contacted state of the detecting pipe 20. In this embodiment the reference frequency is established with a limit frequency fl shown in FIG. 9.

Instead of the frequency comparator 54, a filter having characteristic show by a curve A may be used. In this case, the frequency shift can be detected by detecting a change of an output of the filter.

There are some cases where the oscillation stoppes at touching of the granular material. For these cases, a vibration detection circuit 52 detects the stop of the oscillation is provided.

Figure 10:
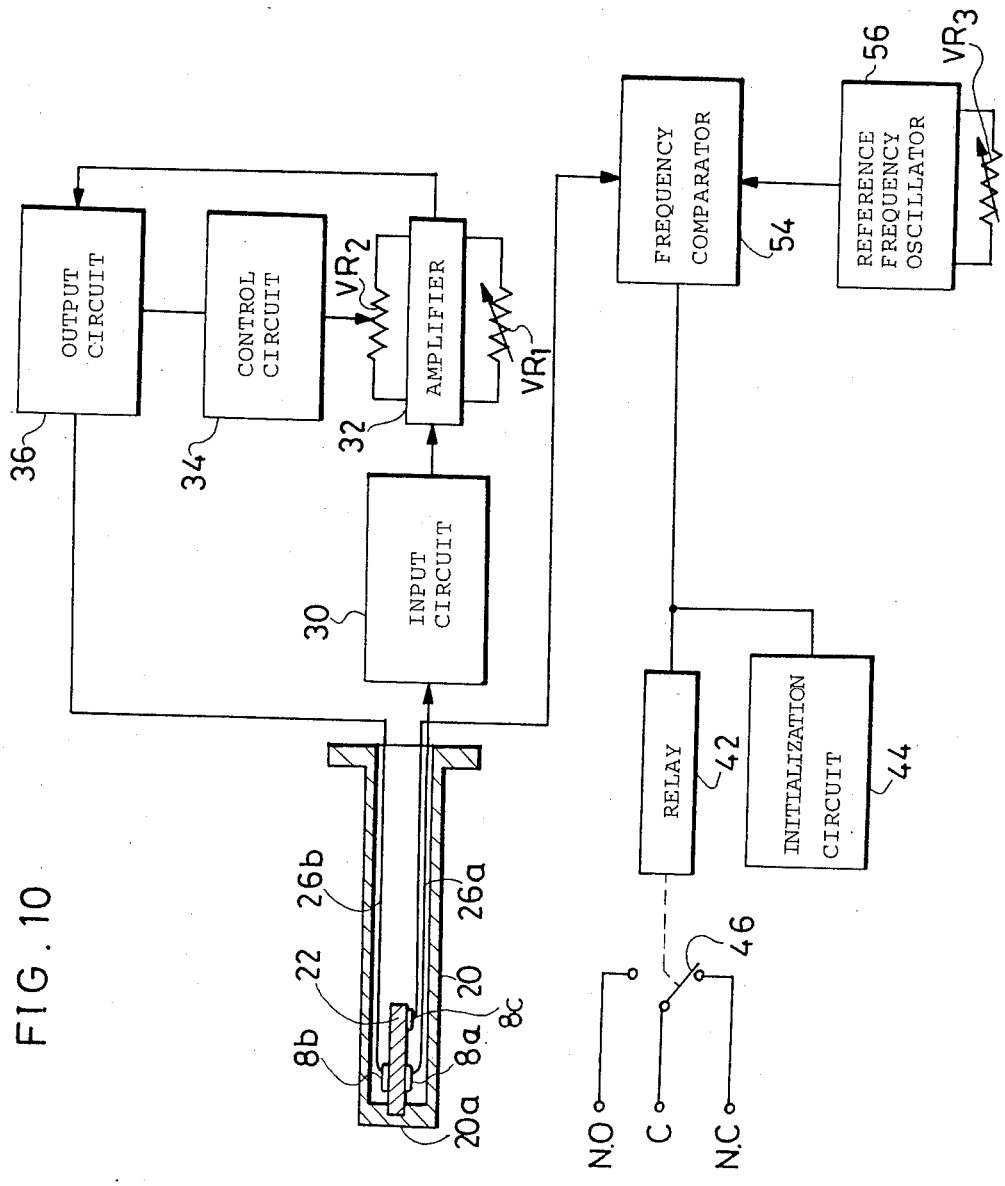
FIG. 10 is a block diagram of another embodiment of the vibrator-type level sensor embodying the present invention.

FIG. 10 shows a block diagram of other embodiment of the present invention. In this embodiment, the detecting piezo-electric device 8c is provided on the inner vibration member 22. The detecting piezo-electric device 8c detects the vibration of the inner vibration member 22, and output the detected signal to the frequency comparator 54.

Figure 11:
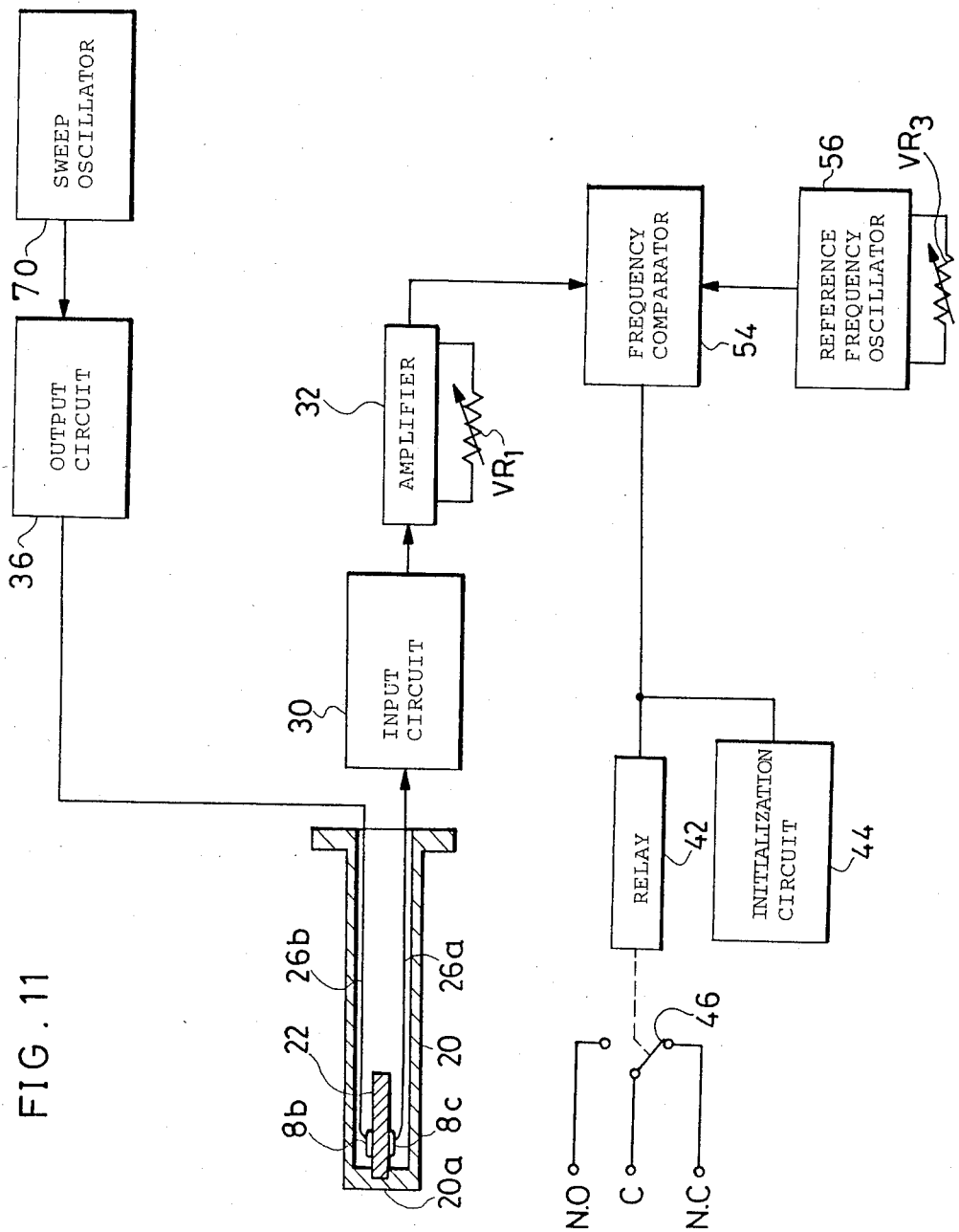
FIG. 11 is a block diagram of still other embodiment of the vibrator-type level sensor embodying the present invention.

FIG. 11 shows a block diagram of still other embodiment of the present invention. The vibrating piezo-electric device 8b receives output from a sweep oscillator 70 through an output circuit 36, and vibrates the inner vibration member 22. The detecting piezo-electric device 8c provided on the vibration member 22 converts this vibration into electric signal. The converted electric signal inputted to the amplifier 32 through the input circuit 30. The output from the amplifier 32 is inputted to the frequency comparator 54. In the frequency comparator 54, a frequency of the output signal from the amplifier 32 is compared with a reference frequency.

Figure 12:
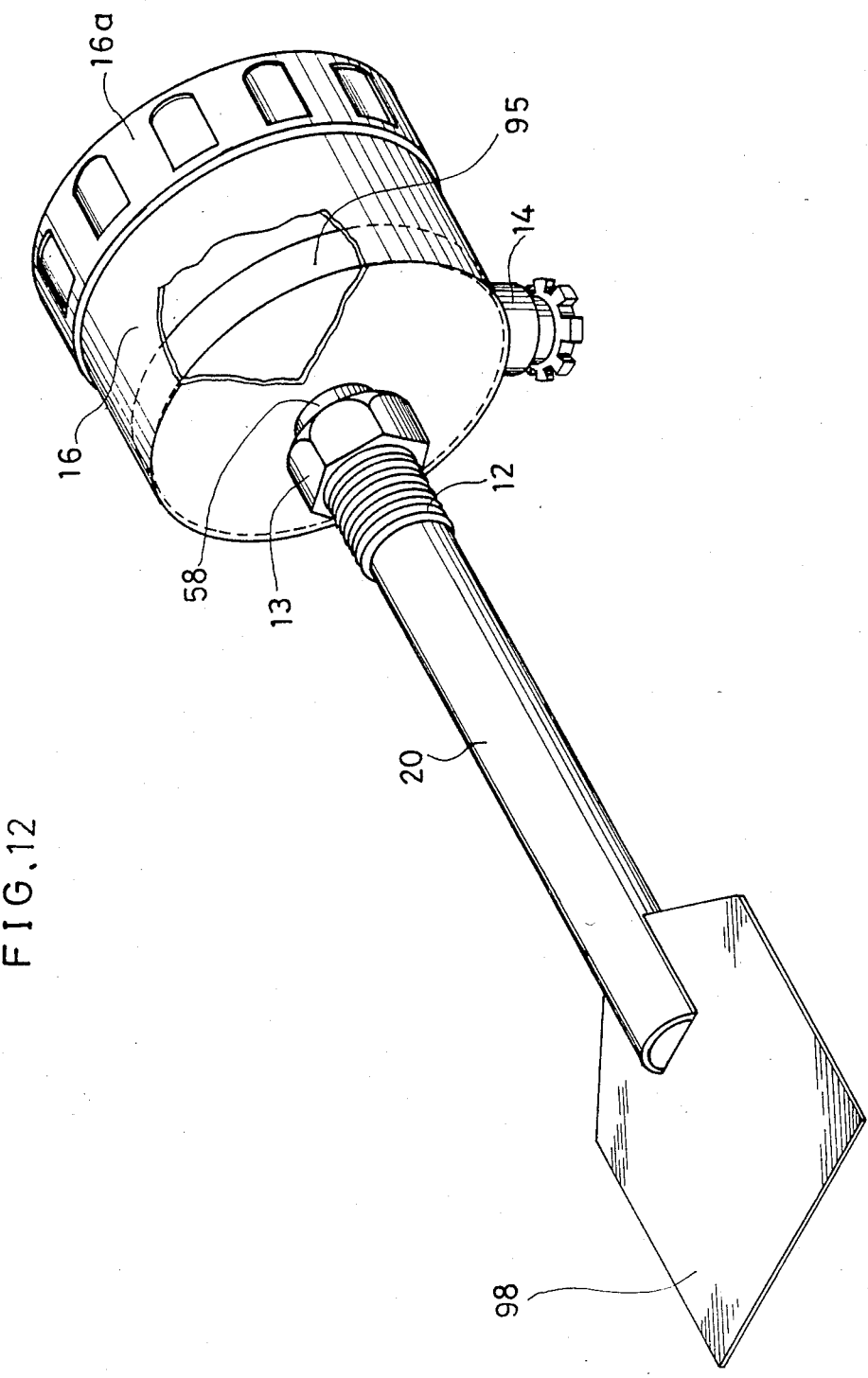
FIG. 12 is a perspective view of the vibrator-type level sensor embodying the present invention, having a paddle.

FIG. 12 shows a vibrator-type level sensor suitable for detecting a level of liquid material or material having little apparent specific gravity. Because the liquid material or material having little apprent specific gravity such as powder of styrofoam, little influences the vibration of the inner vibration member 22, there are some cases where the level of its material cannot be detected. In this embodiment, a paddle 95 which increases a sensitiveness is fixed to the detecting pipe 20. The paddle 98 is provided parallel to a surface of the material to be detected.

As has been described in detail for various embodiments, the vibrator-type level sensor in accordance with the present invention has accurate detection even after long time service, as a result of adoption of the structure that the inner vibration member 22 is put into the detecting pipe 20, and the structure may dispense with the use of diaphragm. By eliminating the diaphragm, which is mechanically weak and is cause of unstable oscillation by adhering the granular material or the like, the operational life time of the vibrator-type level sensor can be prolonged and more accurate detection can be obtained.

Although the invention has been described in its preferred form with a certain degree of particularity, it is understood that the present disclosure of the preferred form has been changed in the details of construction and the combination and arrangement of parts may be resorted to without departing from the spirit and scope of the invention as hereinafter claimed.

What is claimed is:

1. A vibrator-type level sensor comprising
   a hollow member one end of which is fixed and other end of which is blocked, said hollow member having a predetermined wall thickness,
   an inner vibration member which is provided in the other end of the hollow member and one end of which is fixed to the other end of the hollow member by a blocking member which is not a diaphragm and is substantially thicker than said hollow member wall thickness,
   vibrating means for vibrating the inner vibration member, said blocking member coupling vibrations from said vibration member to said hollow member, whereby the latter is forced into vibration, and
   detecting means for detecting a decrease of vibration.

2. A vibrator-type level sensor in accordance with claim 1, wherein
   the hollow member is a cylinder.

3. A vibrator-type level sensor in accordance with claim 2, wherein
   the vibrating means comprises an oscillation circuit having
   a vibrating piezo-electric device provided on the inner vibration member, for vibrating the inner vibration member,
   a receiving piezo-electric device provided on the inner vibration member, for receiving the vibration of the inner vibration member, and
   an amplifier for amplifying an output of the receiving piezo-electric device and impressing the amplified output to the vibrating piezo-electric device, and
   the detecting means comprises
   a comparator which outputs a detecting signal when an output of the oscillation circuit becomes smaller than a reference signal.

4. A vibrator-type level sensor in accordance with claim 2, wherein
   a value of a ratio of the cylinder's length and a length of the inner vibration member is larger than approximate 1.6.

5. A vibrator-type level sensor comprising
   a cylindrical hollow member one end of which is fixed and other end of which is blocked,
   an inner vibration member which is provided in the other end of the hollow member and one end of which is fixed to the other end of the hollow member,
   vibrating means for vibrating the inner vibration member, wherein the vibrating means comprises an oscillation circuit having a vibrating piezo-electric device provided on the inner vibration member, for vibrating the inner vibration member, and a receiving piezo-electric device provided on the inner vibration member, for receiving the vibration of the inner vibration member, a phase comparator for outputting a phase difference signal between a reference phase and an output phase of the vibrating piezo-electric device, a phase adjustment amplifier for amplifying an output of the receiving piezo-electric device, adjusting its output phase to the reference phase in accordance with the phase difference signal, and impressing the amplified output to the vibrating piezo-electric device, and detecting means for detecting a decrease of vibration of the inner vibration member, which detecting means comprises a detecting circuit which produces a detecting signal when there is a phase difference between the reference phase and the output phase of the vibrating piezo-electric device.

6. A vibrator-type level sensor in accordance with claim 5, wherein a value of a ratio of the cylinder length and a length of the inner vibration member is larger than approximate 1.0 and smaller then approximate 1.6.

7. A vibrator-type level sensor in accordance with claim 2, wherein the vibrating means comprises a vibrating piezo-electric device, provided on the inner vibration member, for vibrating the inner vibration member, and an oscillator for impressing oscillation output to the vibrating piezo-electric device, and the detecting means comprises a detecting piezo-electric device, provided on the inner vibration member, for detecting the vibration of the inner vibration member, and a comparator which output a detecting signal when an output of the detecting piezo-electric device becomes smaller than a reference signal.

8. A vibrator-type level sensor in accordance with claim 7, wherein a value of a ratio of the cylinder length and a length of the inner vibration member is larger than approximate 1.0.

9. A vibrator-type level sensor in accordance with claim 1, further comprises a weight, fixed to the end of the hollow member, the mass thereof being sufficiently larger than that of the vibrating means to stabilize the vibration by avoiding undesirable vibration of the end of the hollow member.

10. A vibrator-type level sensor in accordance with claim 2, further comprises a paddle fixed to the cylinder parallel to material to be detected.

11. A vibrator-type level sensor comprising a hollow member one end of which is fixed and other end of which is blocked, said hollow member having a predetermined wall thickness, an inner vibration member which is provided in the other end of the hollow member and one end of which is fixed to the other end of the hollow member by a blocking member which is not a diaphragm and is substantially thicker than said hollow member wall thickness, vibrating means for vibrating the inner vibration member, said blocking member coupling vibrations from said vibration member to said hollow member, whereby the latter is forced into vibration, detecting means for detecting a change of vibration frequency.

12. A vibrator-type level sensor in accordance with claim 11, wherein the hollow member is a cylinder.

13. A vibrator-type level sensor comprising a cylindrical hollow member one end of which is fixed and other end of which is blockaded, an inner vibration member which is provided in the other end of the hollow member and one end of which is fixed to the other end of the hollow member, vibrating means for vibrating the inner vibration member, wherein the vibrating means comprises an oscillation circuit having a vibrating piezo-electric device provided on the inner vibration member, for vibrating the inner vibration member, a receiving piezo-electric device provided on the inner vibration member, for receiving the vibration of the inner vibration member, and an amplifier for amplifying an output of the receiving piezo-electric device and impressing the amplified output to the vibrating piezo-electric device, detecting means for detecting a change of vibration frequency of the inner vibration member, the detecting means comprising a frequency comparator which produces a detecting signal when the difference between a frequency of the oscillation circuit and a reference frequency is larger than a predetermined value.

14. A vibrator-type level sensor in accordance with claim 13, wherein the detecting means further comprises a detection circuit for vibration which outputs a detecting signal at no output signal from the oscillation circuit.

15. A vibrator-type level sensor comprising a cylindrical hollow member one end of which is fixed and other end of which is blockaded, an inner vibration member which is provided in the other end of the hollow member and one end of which is fixed to the other end of the hollow member, vibrating means for vibrating the inner vibration member, wherein the vibrating means comprises an oscillation circuit having a vibrating piezo-electric device, provided on the inner vibration member, for vibrating the inner vibration member, a receiving piezo-electric device, provided on the inner vibration member, for receiving the vibration of the inner vibration member, and an amplifier for amplifying an output of the receiving piezo-electric device and impressing the amplified output to the vibrating piezo-electric device, detecting means for detecting a change of vibration frequency of the inner vibration member, the detecting means comprising a detecting piezo-electric device, provided on the inner vibration member, for detecting the vibration of the inner vibration member, and a frequency comparator which outputs a detecting signal when a difference between a frequency of output of the detecting piezo-electric device and a reference frequency is larger than predetermined value.

16. A vibrator-type level sensor in accordance with claim 15, wherein
the detecting means further comprises
a detection circuit for vibration which outputs a detecting signal at no output signal from the oscillation circuit.

17. A vibrator-type level sensor comprising
a cylindrical hollow member one end of which is fixed and other end of which is blockaded,
an inner vibration member which is provided in the other end of the hollow member and one end of which is fixed to the other end of the hollow member,
vibrating means for vibrating the inner vibration member, wherein the vibrating means comprises
a vibrating piezo-electric device provided on the inner vibration member, for vibrating the inner vibration member, and
a sweep oscillator for impressing swept oscillation output to the vibrating piezo-electric device, and
detecting means for detecting a change of vibration frequency of the inner vibration member, the detecting means comprising
a detecting piezo-electric device provided on the inner vibration member, for detecting the vibration of the inner vibration member, and
a frequency comparator which outputs a detecting signal when a difference between a frequency of output of the detecting piezo-electric device and a reference frequency is larger than predetermined value.

18. A vibrator-type level sensor in accordance with claim 17, wherein
the detecting means further comprises
a detection circuit for vibration which output a detecting signal at no output signal from the oscillation circuit.

19. A vibrator-type level sensor in accordance with claim 12, wherein
the detecting means comprises
a filter which varies its output by a frequency change of the inner vibration member.

20. A vibrator-type level sensor in accordance with claim 11 further comprises
a weight, fixed to the end of the hollow member, the mass thereof being sufficiently larger than that of the vibrating means to stabilize the vibration by avoiding undesirable vibration of the end of the hollow member.

21. A vibrator-type level sensor in accordance with claim 12, further comprises
a paddle fixed to the cylinder parallel to material to be detected.

* * * * *